US010429852B2

(12) United States Patent
Qian et al.

(10) Patent No.: US 10,429,852 B2
(45) Date of Patent: Oct. 1, 2019

(54) METHODS AND DEVICES FOR CONTROLLING SELF-BALANCING VEHICLE TO PARK

(71) Applicant: Beijing Xiaomi Mobile Software Co., Ltd., Beijing (CN)

(72) Inventors: Zhuang Qian, Beijing (CN); Fei Xiangli, Beijing (CN); Baoke Chen, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 246 days.

(21) Appl. No.: 15/397,271

(22) Filed: Jan. 3, 2017

(65) Prior Publication Data
US 2017/0285650 A1    Oct. 5, 2017

(30) Foreign Application Priority Data

Mar. 29, 2016    (CN) .......................... 2016 1 0188056

(51) Int. Cl.
*G05D 1/02*    (2006.01)
*B62K 11/00*    (2006.01)
(Continued)

(52) U.S. Cl.
CPC ........... *G05D 1/0246* (2013.01); *B60W 30/06* (2013.01); *B62D 15/0285* (2013.01); *B62H 3/00* (2013.01);
(Continued)

(58) Field of Classification Search
CPC ........ G07B 15/02; G07B 15/00; H04N 7/181; H04N 7/18; H04N 5/247; H04N 5/23203;
(Continued)

(56) References Cited

U.S. PATENT DOCUMENTS 7,579,964 B2 *    8/2009    Nath .................. G06Q 30/0284
                                                                    235/382
2004/0050611 A1    3/2004    Kamen et al.
(Continued)

FOREIGN PATENT DOCUMENTS

CN    102478657 A    5/2012
CN    102915638 A    2/2013
(Continued)

OTHER PUBLICATIONS

Extended Search Report for European Patent Application No. 16197457.1-1755, from the European Patent Office, dated Jun. 1, 2017.
(Continued)

*Primary Examiner* — Abby Y Lin
*Assistant Examiner* — Sanjeev Malhotra
(74) *Attorney, Agent, or Firm* — Finnegan, Henderson, Farabow, Garrett & Dunner LLP

(57) ABSTRACT

A method for controlling a self-balancing vehicle to park is disclosed. The method is performed by the self-balancing vehicle and includes: sending a message of requesting for parking assistance to a surveillance camera device for controlling the self-balancing vehicle to park; receiving a first response message returned from the surveillance camera device according to the message of requesting for parking assistance, the first response message including parking instruction information for controlling the self-balancing vehicle to travel from a current location of the self-balancing vehicle to a target location; and controlling the self-balancing vehicle to travel from the current location to the target location and to park according to the parking instruction information.

16 Claims, 13 Drawing Sheets

(51) Int. Cl.
*B60W 30/06* (2006.01)
*G05D 1/00* (2006.01)
*B62D 15/02* (2006.01)
*B62H 3/00* (2006.01)

(52) U.S. Cl.
CPC .......... *B62K 11/007* (2016.11); *G05D 1/0011* (2013.01); *G05D 1/0276* (2013.01); *G05D 1/0282* (2013.01)

(58) Field of Classification Search
CPC ........... H04N 5/23216; H04N 5/23229; H04N 5/23296; H04N 7/183; B62D 15/0285; B62D 15/028; B62D 61/02; G06Q 30/0284; G06Q 50/30; G06Q 50/265; G06Q 10/02; G06Q 20/02; G06Q 20/145; G06Q 30/04; G08G 1/0175; G08G 1/14; G08G 1/142; G08G 1/144; G08G 1/148; G08G 1/017; G08G 1/143; G08G 1/056; G08G 1/052; G08G 1/133; G08G 1/146; G08G 1/147; G08G 1/168; G08G 1/00; G08G 1/149; B60W 30/06; B60W 2550/10; B60W 10/20; G06K 9/00771; G06K 2209/15; G06K 9/00785; G06K 9/00342; G06K 9/00624; G06K 9/00791; G06K 9/008383; G06K 9/18; G06K 9/325; G06K 9/6201; G06K 9/00; G06K 9/0063; G06T 2207/30264; G06T 7/70; G06T 2207/10004; G06T 2207/30236; G06T 7/292; G06T 7/73; G06T 7/20; G06T 7/90; B60R 2300/105; B60R 1/00; B60R 2300/806; B60R 11/04; B60R 1/088; B60R 1/12; B60R 2001/1215; B60R 2001/1253; B60R 2300/207; B60R 2300/301; B60R 2300/406; B60R 2300/8066; B60R 2300/8093; G07F 17/246; G07F 17/24; G07F 17/0021; B62K 11/007; G01C 21/26; G01C 21/00; G01C 21/20; G01C 21/36; G01C 21/365; G05D 1/021; G05D 1/0022; G05D 1/0088; B60C 23/0408; B60N 2/976; B60Q 1/2665; B60Q 5/006; B60Q 9/00; B60T 2201/10; B62H 1/12; B62H 1/02; G01S 13/862; G01S 13/865; G01S 13/867; G08B 25/12; H04W 4/02; Y02T 10/645; Y02T 10/7005; Y02T 10/72; Y02T 10/7275
USPC ................... 701/3, 28, 41, 70, 538; 705/13; 348/114, 148; 340/932.2; 180/181; 235/382; 315/153; 1/1
See application file for complete search history.

(56) References Cited

U.S. PATENT DOCUMENTS

| | | | | |
|---|---|---|---|---|
| 2004/0098185 A1* | 5/2004 | Wang | .................... | B60T 8/1706 701/70 |
| 2004/0119610 A1* | 6/2004 | Maemura | ............... | B60Q 9/005 340/932.2 |
| 2005/0086100 A1* | 4/2005 | Yanagisawa | ........... | G01C 21/26 705/13 |
| 2007/0083424 A1* | 4/2007 | Lang | ...................... | G06Q 10/02 705/13 |
| 2008/0158010 A1* | 7/2008 | Nath | .................. | G06Q 30/0284 340/932.2 |
| 2010/0156672 A1 | 6/2010 | Yoo et al. | | |
| 2011/0298927 A1* | 12/2011 | Taylor | .................. | B60C 23/0408 348/148 |
| 2012/0092190 A1* | 4/2012 | Stefik | ...................... | G06Q 10/02 340/932.2 |
| 2012/0287279 A1* | 11/2012 | Tanaka | .................. | G08G 1/168 348/148 |
| 2014/0015959 A1* | 1/2014 | Durvasula | ............. | E04H 4/1654 348/114 |
| 2014/0036076 A1 | 2/2014 | Nerayoff et al. | | |
| 2014/0121883 A1* | 5/2014 | Shen | .................. | B62D 15/0285 701/28 |
| 2014/0211016 A1* | 7/2014 | Nerayoff | ................ | H04N 7/181 348/148 |
| 2014/0249896 A1* | 9/2014 | Nerayoff | ................ | H04N 7/181 705/13 |
| 2014/0257943 A1* | 9/2014 | Nerayoff | ................ | G06T 7/292 705/13 |
| 2014/0350855 A1* | 11/2014 | Vishnuvajhala | ... | G01C 21/3685 701/538 |
| 2014/0354452 A1 | 12/2014 | Okuyama | | |
| 2015/0096820 A1* | 4/2015 | Strack | ................... | B62K 11/007 180/181 |
| 2015/0138001 A1* | 5/2015 | Davies | ................... | G08G 1/149 340/932.2 |
| 2015/0138362 A1* | 5/2015 | Stefik | ..................... | G06Q 10/02 348/148 |
| 2016/0019790 A1 | 1/2016 | Tobolski et al. | | |
| 2016/0042643 A1 | 2/2016 | Hohenacker | | |
| 2016/0073477 A1* | 3/2016 | Marman | .......... | G08B 13/19613 315/153 |
| 2016/0075375 A1* | 3/2016 | Yamashita | ........... | B62D 15/028 701/41 |
| 2016/0078299 A1* | 3/2016 | Nerayoff | ................ | H04N 7/181 705/13 |
| 2016/0078759 A1* | 3/2016 | Nerayoff | .............. | G06Q 20/145 701/3 |
| 2016/0189435 A1* | 6/2016 | Beaurepaire | ........... | G05D 1/021 705/13 |
| 2016/0229342 A1* | 8/2016 | Taylor | .................. | B60C 23/0408 |
| 2016/0328971 A1* | 11/2016 | Nakhjavani | ............ | G08G 1/144 |
| 2016/0368489 A1* | 12/2016 | Aich | ...................... | B60W 30/06 |
| 2017/0028985 A1* | 2/2017 | Kiyokawa | .......... | B62D 15/0285 |
| 2017/0043831 A1* | 2/2017 | Zhu | ......................... | B62H 7/00 |
| 2017/0166115 A1* | 6/2017 | Pal | ........................ | G08G 1/163 |
| 2017/0169712 A1* | 6/2017 | Penilla | .................. | G05D 1/0011 |
| 2017/0183001 A1* | 6/2017 | Yamamoto | ............ | B60W 30/06 |
| 2017/0249810 A1* | 8/2017 | Zerick | .................... | A41D 1/002 |
| 2017/0259850 A1* | 9/2017 | Yamashita | ............... | B62D 6/00 |
| 2017/0278394 A1* | 9/2017 | Fuehrer | ............... | B62D 15/0285 |
| 2017/0282913 A1* | 10/2017 | Qian | ..................... | G05D 1/0212 |
| 2018/0154971 A1* | 6/2018 | Zuo | ......................... | B62H 1/02 |

FOREIGN PATENT DOCUMENTS

| | | |
|---|---|---|
| CN | 103596812 A | 2/2014 |
| CN | 104932505 A | 9/2015 |
| CN | 104981377 A | 10/2015 |
| CN | 105116817 A | 12/2015 |
| CN | 105223952 A | 1/2016 |
| CN | 105280015 A | 1/2016 |
| CN | 105721834 A | 6/2016 |
| KR | 20080053835 A | 6/2008 |
| WO | WO 2015193059 A1 | 12/2015 |

OTHER PUBLICATIONS

International Search Report in International Application No. PCT/CN2016/091981, dated Jan. 4, 2017.

English version of International Search Report of PCT Application No. PCT/CN2016/091981, dated Jan. 4, 2017, issued by the ISA/CN—State Intellectual Property Office of the P.R. China.

* cited by examiner

METHODS AND DEVICES FOR CONTROLLING SELF-BALANCING VEHICLE TO PARK

CROSS-REFERENCE TO RELATED APPLICATIONS

The present application is based upon and claims priority to Chinese Patent Application No. CN201610188056.3 filed Mar. 29, 2016, the entire contents of which are incorporated herein by reference.

TECHNICAL FIELD

The present disclosure generally relates to the field of smart transportation means, and more particularly, to methods and devices for controlling a self-balancing vehicle to park.

BACKGROUND

A self-balancing vehicle is a newly emerged short-distance transportation means. The self-balancing vehicle can achieve self-balancing, travel forward and backward, and make turns by utilizing an electrical motor and a balancing device. If the self-balancing vehicle does not operate for a while, it can be automatically turned off, to save electrical power. When the self-balancing vehicle is turned off automatically and has nothing to rely on for parking, it may lose self-balance and fall down, causing physical damages to the self-balancing vehicle.

In the related art, the self-balancing vehicle can emit sound or light and the like as a warning signal when the self-balancing vehicle is automatically turned off, to prompt a user nearby to manually put the self-balancing vehicle in a proper place. The sound or light emitted by the self-balancing vehicle can disturb other people around. In particular, when the self-balancing vehicle is in a small space, the sound or light emitted by the self-balancing vehicle can cause noise pollution. This results in poor user experience. In addition, the self-balancing vehicle requires a user's assistance to park. When there is no one around or no one can reach the self-balancing vehicle in time to park it, the self-balancing vehicle may fall down.

SUMMARY

According to a first aspect of the present disclosure, there is provided a method for controlling a self-balancing vehicle to park. The method is performed by the self-balancing vehicle and includes: sending a message of requesting for parking assistance to a surveillance camera device for controlling the self-balancing vehicle to park; receiving a first response message returned from the surveillance camera device according to the message of requesting for parking assistance, the first response message including parking instruction information for controlling the self-balancing vehicle to travel from a current location of the self-balancing vehicle to a target location; and controlling the self-balancing vehicle to travel from the current location to the target location and to park according to the parking instruction information.

According to another aspect of the present disclosure, there is provided a device for controlling a self-balancing vehicle to park. The device includes a processor, and a memory for storing instructions executable by the processor. The processor is configured to perform: sending a message of requesting for parking assistance to a surveillance camera device for controlling the self-balancing vehicle to park; receiving a first response message returned from the surveillance camera device according to the message of requesting for parking assistance, the first response message including parking instruction information for controlling the self-balancing vehicle to travel from a current location of the self-balancing vehicle to a target location; and controlling the self-balancing vehicle to travel from the current location to the target location and to park according to the parking instruction information.

According to another aspect of the present disclosure, there is provided a device for controlling a self-balancing vehicle to park. The device includes a processor, and a memory for storing instructions executable by the processor. The processor is configured to perform: receiving a message of requesting for parking assistance sent from a self-balancing vehicle; determining a current location and a target location of the self-balancing vehicle; according to the current location and the target location of the self-balancing vehicle, generating parking instruction information for controlling the self-balancing vehicle to travel from the current location to the target location; and sending a first response message to the self-balancing vehicle, the first response message including the parking instruction information to control the self-balancing vehicle to park according to the parking instruction information.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1A:
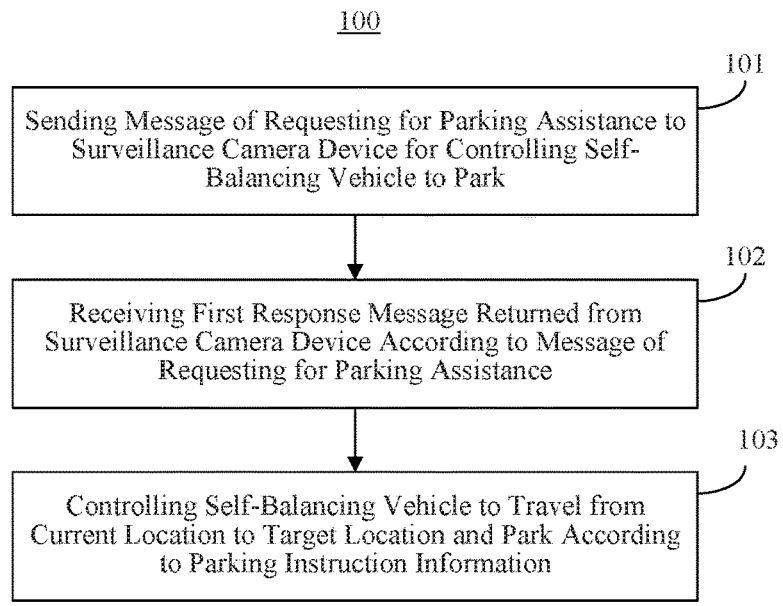
FIG. 1A is a flowchart illustrating a method for controlling a self-balancing vehicle to park according to an exemplary embodiment of the present disclosure.
Figure 1B:
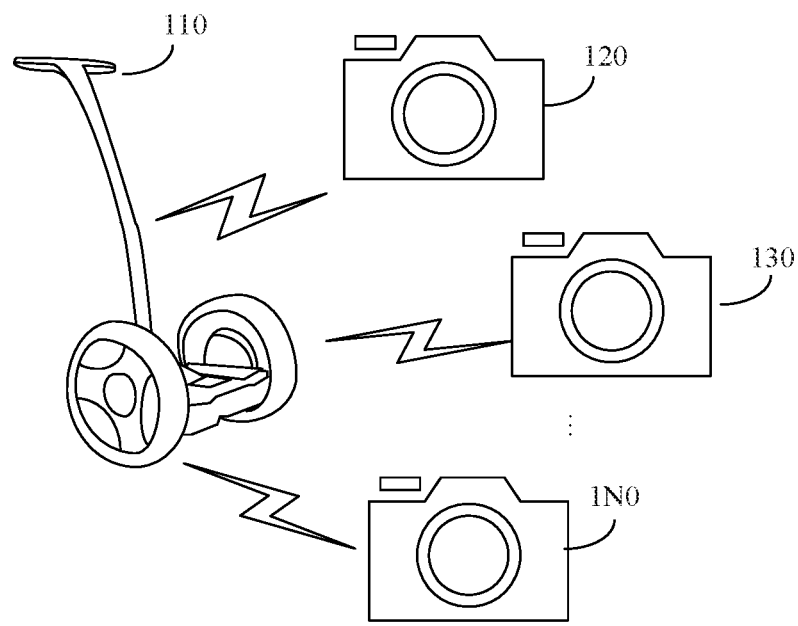
FIG. 1B is a schematic diagram illustrating a system for controlling a self-balancing vehicle to park according to an exemplary embodiment.

FIG. 1A is a flowchart illustrating a method 100 for controlling a self-balancing vehicle to park according to an exemplary embodiment. FIG. 1B is a schematic diagram illustrating a system 150 for parking a self-balancing vehicle according to an exemplary embodiment. The method 100 for controlling a self-balancing vehicle to park can be performed by a self-balancing vehicle. As shown in FIG. 1A, the method 100 for controlling a self-balancing vehicle to park includes the following steps.

At step 101, a message of requesting for parking assistance is sent to a surveillance camera device for controlling the self-balancing vehicle to park.

In an embodiment, there may be no place for the self-balancing vehicle to rely on for parking at a current location of the self-balancing vehicle. When the self-balancing vehicle is about to be turned off, it can send a message of requesting for parking assistance through a communication module to a surveillance camera device for controlling the self-balancing vehicle to park.

At step 102, a first response message is received which is returned from the surveillance camera device according to the message of requesting for parking assistance.

In an embodiment, the first response message can include parking instruction information. In an embodiment, the parking instruction information is used for controlling the self-balancing vehicle to travel from the current location to a target location.

At step 103, the self-balancing vehicle travels from the current location to the target location and parks according to the parking instruction information.

In an embodiment, a traveling route from the current location to the target location can be determined according to the parking instruction information, to control the self-balancing vehicle to travel to the target location to park according to the traveling route.

An exemplary system 150, as shown in FIG. 1B, includes a self-balancing vehicle 110 and one or more surveillance camera devices including, e.g., a first surveillance camera device 120, a second surveillance camera device 130, and an Nth surveillance camera device 1N0, where N≥2 and is a natural number. When the self-balancing vehicle 110 is about to be parked, it can select a surveillance camera device to assist itself to park according to a complexity degree of traveling to the target location that each of the surveillance camera devices provides. For example, if the first surveillance camera device 120 provides the lowest complexity degree of traveling to the target location, the self-balancing vehicle 110 can determine to use the first surveillance camera device 120 to assist itself to park according to the complexity degree. In one embodiment, the self-balancing vehicle 110 can establish a preset type of short-distance communication connection with the first surveillance camera device 120 and inquire about whether the first surveillance camera device 120 can control the self-balancing vehicle 110 to park. If the self-balancing vehicle 110 determines that the first surveillance camera device 120 can control the self-balancing vehicle 110 to park, the self-balancing vehicle 110 can send to the first surveillance camera device 120 a message of requesting for parking assistance. Further, the self-balancing vehicle 110 can automatically travel to the target location and park according to the parking instruction information in the first response message returned by the first surveillance camera device 120. In an embodiment, the complexity degree indicates how complex the self-balancing vehicle 110 travels from the current location to the target location.

In the present embodiment, when the self-balancing vehicle is about to be parked, the self-balancing vehicle can send a message of requesting for parking assistance to a surveillance camera device that can control the self-balancing vehicle to park. When the self-balancing vehicle receives a first response message returned from the surveillance camera device, it can automatically parse parking instruction information from the first response message to control the self-balancing vehicle to travel from a current location to a target location. Thus, even if no one can timely come to the location of the self-balancing vehicle, the self-balancing vehicle would not fall down. Therefore, the problem in the related art that the self-balancing vehicle requires human assistance to be parked can be solved, and the user experience of using the self-balancing vehicle can be improved.

In an embodiment, before the step 101 of sending a message of requesting for parking assistance to a surveillance camera device for controlling the self-balancing vehicle to park, the method 100 can further include the following step.

The self-balancing vehicle determines whether there is a surveillance camera device that can establish a preset type of short-distance communication connection with the self-balancing vehicle.

If there is a surveillance camera device that can establish a preset type of short-distance communication connection with the self-balancing vehicle, the self-balancing vehicle determines whether the surveillance camera device can control the self-balancing vehicle to park.

In an embodiment, in determining whether the surveillance camera device can control the self-balancing vehicle to park, the method can include the following steps.

The self-balancing vehicle determines whether the surveillance camera device has permission to control the self-balancing vehicle to park by looking up a preset control list that records surveillance camera devices which have permission to control the self-balancing vehicle to park.

If it is determined that the surveillance camera device has permission to control the self-balancing vehicle to park, the self-balancing vehicle sends an inquiry message to a surveillance camera device, for inquiring of the surveillance camera device about whether the surveillance camera device can control the self-balancing vehicle to park.

The self-balancing vehicle may receive a second response message, which is returned by the surveillance camera device according to the inquiry message. The second response message includes a complexity degree of controlling the self-balancing vehicle to park.

If the complexity degree is smaller than a preset complexity threshold, the self-balancing vehicle determines that the surveillance camera device can control itself to park.

In an embodiment, the method 100 can further include the following steps.

If there are two or more surveillance camera devices which have permission to control the self-balancing vehicle to park, the self-balancing vehicle determines a complexity degree for each of the two or more surveillance camera devices.

The self-balancing vehicle determines a surveillance camera device corresponding to a minimum value of the complexity degrees of the two or more surveillance camera devices as the surveillance camera device for controlling the self-balancing vehicle to park, and performs the step 101 of sending a message of requesting for parking assistance to the surveillance camera device.

In an embodiment, the method 100 can further include the following steps.

The self-balancing vehicle determines whether it arrives at the target location.

After it is determined that the self-balancing vehicle arrives at the target location, the self-balancing vehicle adjusts its posture such that the self-balancing vehicle can park at the target location.

In an embodiment, the method 100 can further include the following steps.

The self-balancing vehicle determines whether a location requesting message sent from the surveillance camera device is received.

If a location requesting message sent from the surveillance camera device is received, the self-balancing vehicle generates a location indication signal for indicating the current location of the self-balancing vehicle. The location indication signal is an acoustic signal and/or an optical signal.

Consistent with the embodiments of the present disclosure, the method 100 can eliminate the need for human assistance to park the self-balancing vehicle, and a surveillance camera device can be employed for controlling the self-balancing vehicle to park. The self-balancing vehicle can automatically park according to the parking instruction information transmitted from the surveillance camera device. Therefore, the self-balancing vehicle would not fall down when being turned off.

Figure 2:
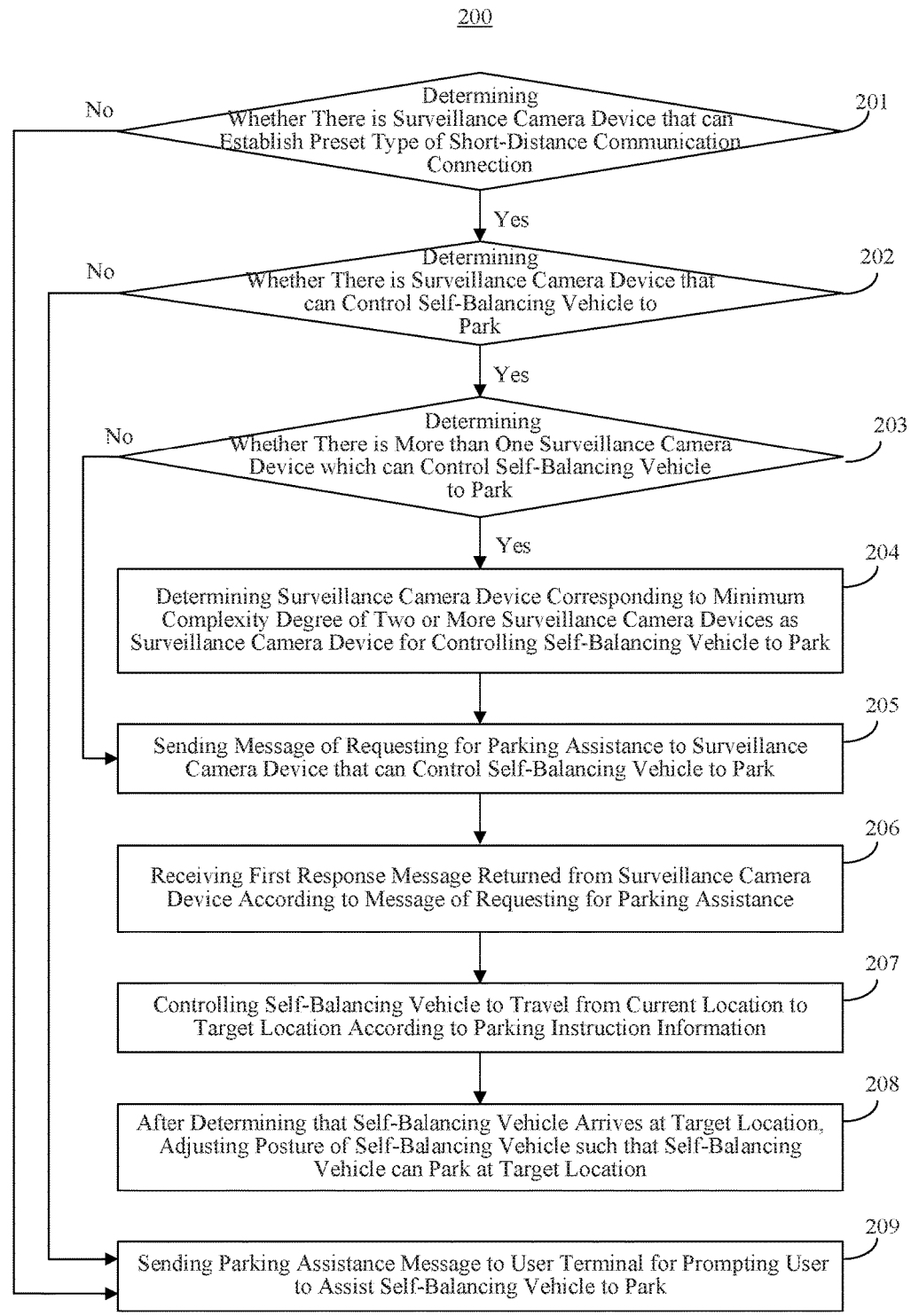
FIG. 2 is a flowchart illustrating another method for controlling a self-balancing vehicle to park according to a first exemplary embodiment.

FIG. 2 is a flowchart illustrating a method 200 for controlling a self-balancing vehicle to park according to an exemplary embodiment. As shown in FIG. 2, the method 200 for controlling a self-balancing vehicle to park includes the following steps.

At step 201, it is determined whether there is a surveillance camera device that can establish a preset type of short-distance communication connection with the self-balancing vehicle.

In an embodiment, the preset type of short-distance communication connection can be determined by a communication module built in the self-balancing vehicle. In an embodiment, the preset type of short-distance communication connection can be Bluetooth, Wireless Fidelity (WiFi), Local Area Network, ZigBee protocol, Near Field Communication (NFC) or the like.

In an embodiment, when the self-balancing vehicle is about to be parked, it detects whether currently there is a surveillance camera device with which it can establish a preset type of short-distance communication connection. For example, a Bluetooth module of the self-balancing vehicle can be controlled to detect whether currently there is a surveillance camera device with which it can establish a Bluetooth connection.

If there is a surveillance camera device with which the self-balancing vehicle can establish a preset type of short-distance communication connection, the method 200 proceeds to step 202. Otherwise the method 200 proceeds to step 209.

At step 202, it is determined whether there is a surveillance camera device that can control the self-balancing vehicle to park. If there is a surveillance camera device that can control the self-balancing vehicle to park, the method 200 proceeds to step 203. Otherwise the method 200 proceeds to step 209.

In an embodiment, if a surveillance camera device has a permission to control the self-balancing vehicle and can determine the current location of the self-balancing vehicle and the target location for the self-balancing vehicle to park, it can be determined that the surveillance camera device can control the self-balancing vehicle to park.

In an embodiment, the surveillance camera device can determine the current location of the self-balancing vehicle through a surveillance image. In another embodiment, the surveillance camera device can also prompt the self-balancing vehicle to transmit a location indication signal, so that it can determine the current location of the self-balancing vehicle according to the location indication signal. For example, when the self-balancing vehicle is currently located at a dim place and the surveillance camera device fails to acquire the current location of the self-balancing vehicle, the surveillance camera device can prompt the self-balancing vehicle to transmit a location indication signal for the surveillance camera device to determine the current location of the self-balancing vehicle. In an embodiment, the location indication signal can be an acoustic and/or optical signal.

In an embodiment, the surveillance camera device can determine the target location of the self-balancing vehicle according to a surveillance image.

In an embodiment, after the surveillance camera device determines the current location and the target location of the self-balancing vehicle, a complexity degree of the self-balancing vehicle travelling from the current location to the target location can be calculated. If it is determined that there is no target location for the self-balancing vehicle to park, the complexity degree can be set up to a value exceeding a preset complexity threshold, and sent to the self-balancing vehicle through a response message. The self-balancing vehicle can determine whether the surveillance camera device can control the self-balancing vehicle to park depending on whether the complexity degree exceeds the preset complexity threshold. In an embodiment, if the complexity degree is larger than the preset complexity threshold, the surveillance camera device is determined to be unable to control the self-balancing vehicle to park. If the complexity degree is smaller than the preset complexity threshold, the surveillance camera device is determined to be able to control the self-balancing vehicle to park.

At step 203, it is determined whether there are two or more surveillance camera devices which can control the self-balancing vehicle to park. If there are two or more surveillance camera devices which can control the self-balancing vehicle to park, the method 200 proceeds to step 204. Otherwise, if there is one surveillance camera device which can control the self-balancing vehicle to park, the method 200 proceeds to step 205.

At step 204, the surveillance camera device corresponding to a minimum complexity degree of the two or more surveillance camera devices is determined as the surveillance camera device for controlling the self-balancing vehicle to park, and the method 200 proceeds to step 205.

In an embodiment, the self-balancing vehicle can send an inquiry message to a surveillance camera device. The inquiry message is used for inquiring whether the surveillance camera device can control the self-balancing vehicle to park. A second response message returned by the surveillance camera device according to the inquiry message is received. The complexity degree of controlling the self-balancing vehicle to park is parsed from the second response message. When the complexity degree is smaller than the preset complexity threshold, it can be determined that the surveillance camera device can control the self-balancing vehicle to park.

In an embodiment, if the complexity degree is smaller than the preset complexity threshold, it can be determined that the corresponding surveillance camera device can control the self-balancing vehicle to park. If the complexity degree is not smaller than the preset complexity threshold, it can be determined that the corresponding surveillance camera device cannot control the self-balancing vehicle to park.

In another embodiment, if there are two or more surveillance camera devices that can control the self-balancing vehicle to park, the surveillance camera device corresponding to a minimum complexity degree of the two or more surveillance camera devices is determined to be the surveillance camera device for controlling the self-balancing vehicle to park.

At step 205, a message of requesting for parking assistance is sent to a surveillance camera device that can control the self-balancing vehicle to park.

In an example, two or more surveillance camera devices having permission to control the self-balancing vehicle to park may be located nearby, as shown in FIG. 1B. A complexity degree of the self-balancing vehicle 110 travelling to a target location provided by the surveillance camera device 120 is, for example, 0.3, and a complexity degree of the self-balancing vehicle 110 travelling to the target location provided by the surveillance camera device 130 is, for example, 0.6. In order to reliably park the self-balancing vehicle 110, the surveillance camera device 120 can be selected to assist the self-balancing vehicle 110 to park. A message of requesting for parking assistance is sent to the surveillance camera device 120.

At step 206, a first response message is received which is returned from the surveillance camera device according to the message of requesting for parking assistance.

In an embodiment, the first response message can include parking instruction information, which is used for controlling the self-balancing vehicle to travel from the current location to the target location.

At step 207, the self-balancing vehicle is controlled to travel from the current location to the target location according to the parking instruction information.

At step 208, after it is determined that the self-balancing vehicle arrives at the target location, the self-balancing vehicle is controlled to adjust posture such that the self-balancing vehicle can park at the target location.

In an embodiment, after the self-balancing vehicle arrives at the target location, the gravity center of the self-balancing vehicle may be not laid on the target parking spot. In this case, the self-balancing vehicle can adjust its posture to lay its gravity center on the target parking spot.

At step 209, a parking assistance message is sent to a user terminal for prompting the user to assist the self-balancing vehicle to park.

In an embodiment, the self-balancing vehicle can also transmit a prompting signal such as sound or light to prompt a user nearby to manually park the self-balancing vehicle.

In addition to the beneficial technical effects of the above embodiments, the present embodiment also has the following technical advantages. The self-balancing vehicle can indicate its current location to the surveillance camera device by transmitting a location indication signal, so that even when the self-balancing vehicle is located at a dim place, the surveillance camera device can control the self-balancing vehicle to park. Therefore, the chance of successfully controlling the self-balancing vehicle to park by the surveillance camera device is increased. By adjusting posture of the self-balancing vehicle, the gravity center of the self-balancing vehicle may be laid on the parking spot. Therefore, the reliability of successfully parking the self-balancing vehicle can be improved.

Figure 3:
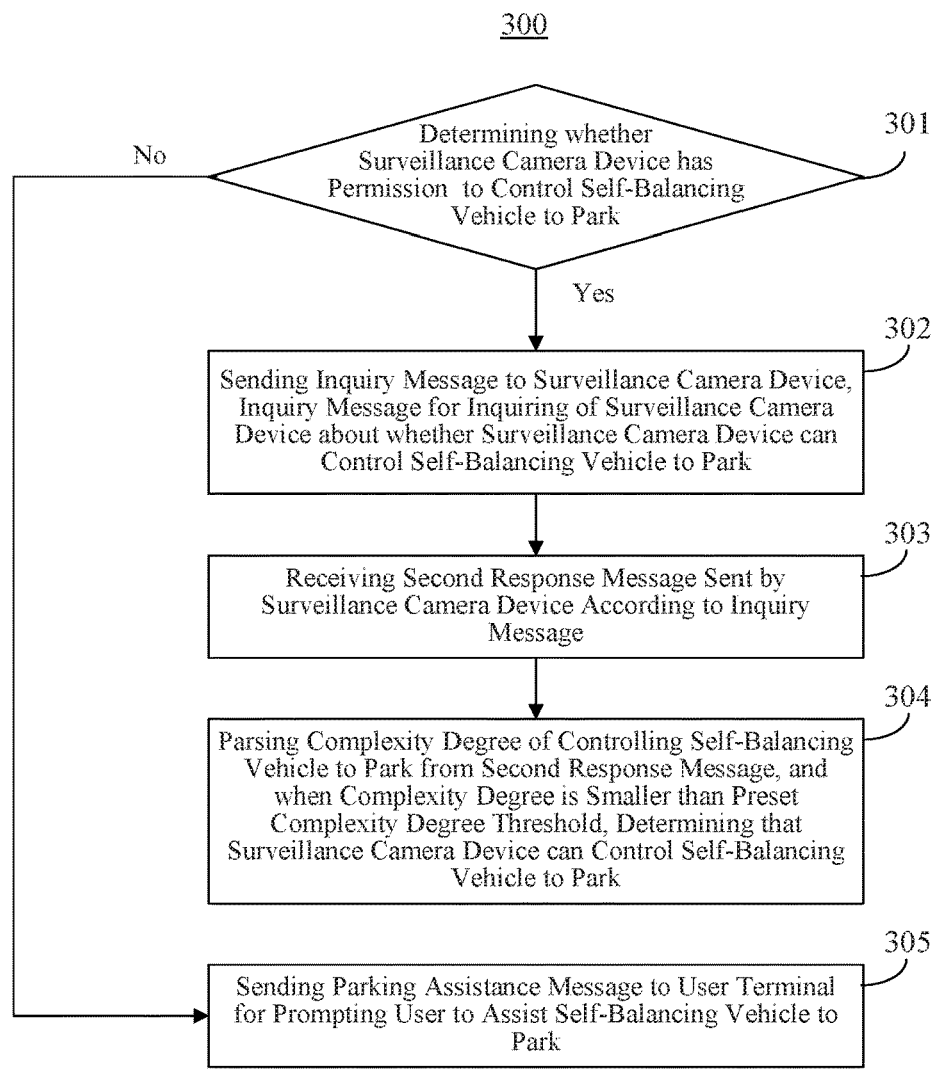
FIG. 3 is a flowchart illustrating another method for controlling a self-balancing vehicle to park according to a second exemplary embodiment.

FIG. 3 is a flowchart illustrating a method 300 for controlling a self-balancing vehicle to park according to another exemplary embodiment. For example, the method 300 may be performed by a self-balancing vehicle. As shown in FIG. 3, the method 300 includes the following steps.

At step 301, it is determined whether the surveillance camera device has permission to control the self-balancing vehicle to park by looking up a preset control list. For example, the preset control list includes all surveillance camera devices that have permission to control the self-balancing vehicle to park. If a surveillance camera device is on the list, it is determined that the surveillance camera device has the permission to control self-balancing vehicle to park, and the method 300 proceeds to step 302. Otherwise the method 300 proceeds to step 305.

In an embodiment, the preset control list is used for recording surveillance camera devices which have permission to control the self-balancing vehicle to park. The self-balancing vehicle can detect a surveillance camera device, which is coupled to the self-balancing vehicle with a preset type of short-distance communication connection. The self-balancing vehicle can search in the preset control list to determine whether the surveillance camera device can control the self-balancing vehicle to park.

In an embodiment, the user can pair the self-balancing vehicle with surveillance camera devices which can control the self-balancing vehicle to park, and create the preset control list in the self-balancing vehicle.

At step 302, an inquiry message is sent to a surveillance camera device. The inquiry message inquires whether the surveillance camera device can control the self-balancing vehicle to park.

At step 303, a second response message sent by the surveillance camera device according to the inquiry message is received.

At step 304, a complexity degree of controlling the self-balancing vehicle to park is parsed from the second response message. When the complexity degree is smaller than the preset complexity degree threshold, it is determined that the surveillance camera device can control the self-balancing vehicle to park.

At step 305, a parking assistance message is sent to a user terminal for prompting the user to assist the self-balancing vehicle to park.

In an embodiment, the self-balancing vehicle can also transmit a prompting signal such as sound or light to prompt a user nearby to manually park the self-balancing vehicle.

Based on the beneficial technical effects of the above embodiments, the present embodiment also has the following technical benefits. The self-balancing vehicle can determine whether a surveillance camera device has permission to control the self-balancing vehicle to park by looking up a preset control list. An inquiry message is sent to the surveillance camera device which has permission to control the self-balancing vehicle to park. It can avoid establishing short-distance communication connection with a surveillance camera device which has no permission to control the self-balancing vehicle to park. It can improve the efficiency of parking the self-balancing vehicle.

Figure 4:
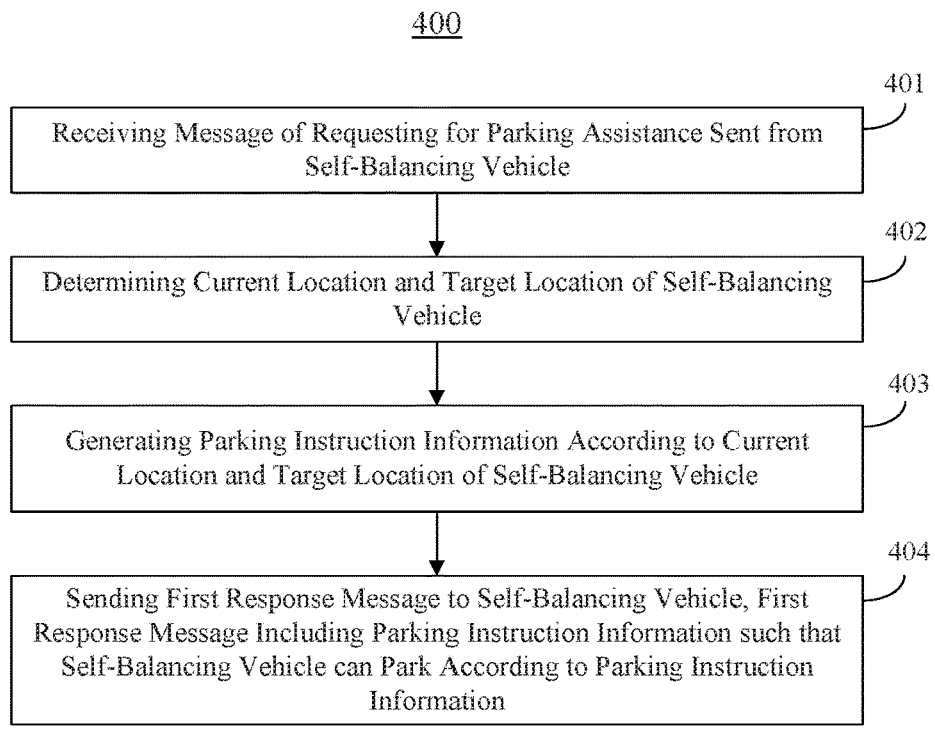
FIG. 4 is a flowchart illustrating another method for controlling a self-balancing vehicle to park according to a third exemplary embodiment.

FIG. 4 is a flowchart illustrating a method 400 for controlling a self-balancing vehicle to park according to another exemplary embodiment. The method 400 may be performed by a surveillance camera device. As shown in FIG. 4, the method 400 for controlling a self-balancing vehicle to park includes the following steps.

At step 401, a message of requesting for parking assistance sent from a self-balancing vehicle is received.

At step 402, a current location of the self-balancing vehicle and a target location of the self-balancing vehicle are determined.

In an embodiment, an imaging apparatus of the surveillance camera device can be controlled to acquire a surveillance image presenting the self-balancing vehicle, and to process the surveillance image to determine the current location of the self-balancing vehicle. In another embodiment, a signal acquiring apparatus of the surveillance camera device can be controlled to acquire the location indication signal transmitted by the self-balancing vehicle, and process the acquired location indication signal to determine the current location of the self-balancing vehicle.

In an embodiment, the imaging apparatus of the surveillance camera device can be controlled to acquire a surveillance image presenting a target parking location for parking the self-balancing vehicle, and process the surveillance image to determine the target location of the self-balancing vehicle.

In an embodiment, the target parking location in the present disclosure can be a portion on a target object which the self-balancing vehicle can rely on. In an embodiment, the target object can be a wall, a cabinet fixed to a location, or other object temporarily fixed to a location, which the self-balancing vehicle can rely upon. It should be understood by those skilled in the art that, the specific location of the parking spot is not limited by the present disclosure.

In an embodiment, if a surveillance camera device has permission to control the self-balancing vehicle and can determine the current location of the self-balancing vehicle and the target location for the self-balancing vehicle to rely on, it can be determined that the surveillance camera device can control the self-balancing vehicle to park.

In an embodiment, if the self-balancing vehicle can travel to a location a target parking spot where the self-balancing vehicle to rely on and there is enough room to accommodate the self-balancing vehicle at the target parking spot, the location of the target parking spot is the target location for the self-balancing vehicle to park.

In an embodiment, if more than one target parking spot for the self-balancing vehicle to park are available identified according to the surveillance image(s) acquired by the image capturing apparatus, complexity degrees of the self-balancing vehicle travelling to the parking spots can be calculated. A target parking spot corresponding to a minimum value of the complexity degrees can be determined as the target parking spot of the self-balancing vehicle.

In another embodiment, if more than one target parking spot for the self-balancing vehicle to park can be determined according to a surveillance image acquired by an image capturing apparatus, the parking spot can be also determined according to reliability of the target objects located at the potential parking spots. For example, two parking spots are determined according to the surveillance image. One is a parking spot adjacent to a wall, and the other is a parking spot adjacent to a central pillar in a hall. Since it is less likely for the parking spot adjacent to the wall than for the parking spot adjacent to the central pillar in the hall to interfere with the passage of people, the parking spot adjacent to the wall can be selected as the target location of the self-balancing vehicle. The reliability level of the parking spots can be determined in advance by the user according to user's experience.

In another embodiment, the target location of the self-balancing vehicle to park can be determined by considering both of the reliability of the target object and the complexity degree of the self-balancing vehicle travelling to the parking spot into account.

At step 403, parking instruction information is generated according to the current location and the target location of the self-balancing vehicle.

In an embodiment, the parking instruction information is used for controlling the self-balancing vehicle to travel from the current location to the target location. Specifically, the parking instruction information can be a route for the self-balancing vehicle to travel from the current location to the target location. For example, the parking instruction information can be "travel forward for 3 meters, turn left for 9 degrees and travel for 2 meters".

At step 404, a first response message is sent to the self-balancing vehicle. The first response message includes the parking instruction information such that the self-balancing vehicle can park according to the parking instruction information.

In the present embodiment, the surveillance camera device can determine the current location and the target location of the self-balancing vehicle according to a captured surveillance image, calculate a route for the self-balancing vehicle travelling from the current location to the target location, and be used to control the self-balancing vehicle to travel from the current location to the target location and park. The reliability of automatically parking the self-balancing vehicle can be improved. A self-balancing vehicle consistent with embodiments of present disclosure requires no or less human assistance to be parked. If no one can timely come to the location of the self-balancing vehicle when it is about to park, the self-balancing vehicle would not fall down.

In an embodiment, the step 402 of determining a current location of the self-balancing vehicle can include: determining whether a current surveillance image of the surveillance camera device presents the self-balancing vehicle; if the current surveillance image presents the self-balancing vehicle, determining the current location of the self-balancing vehicle according to the current surveillance image; if the current surveillance image does not present the self-balancing vehicle, controlling an image capturing apparatus of the surveillance camera device to rotate within a preset range, and to stop rotating when a target surveillance image presenting the self-balancing vehicle is captured; and determining the current location of the self-balancing vehicle according to the target surveillance image.

In an embodiment, the step 402 of determining a target location of the self-balancing vehicle can include: determining whether a current surveillance image of the surveillance camera device presents a target parking spot for the self-balancing vehicle to park; if the current surveillance image presents a target parking spot for the self-balancing vehicle to park, determining the target location of the self-balancing vehicle according to the target parking spot in the current surveillance image; if the current surveillance image does not present a target parking spot for the self-balancing vehicle to park, controlling an image capturing apparatus of the surveillance camera device to rotate within a preset range, and to stop rotating when a target surveillance image presenting a target parking spot is captured; and determining the target location of the self-balancing vehicle according to the target surveillance image.

In an embodiment, the step 402 of determining a current location of the self-balancing vehicle can include: sending a location requesting message to the self-balancing vehicle; when the self-balancing vehicle generates a location indication signal according to the location requesting message, controlling a signal capturing apparatus of the surveillance camera device to capture the location indication signal, the location indication signal being an acoustic signal and/or an optical signal; and determining the current location of the self-balancing vehicle according to the location indication signal.

In an embodiment, the method 400 can further include the following steps: receiving an inquiry message sent from the self-balancing vehicle, the inquiry message being for inquiring of the surveillance camera device about whether the surveillance camera device can control the self-balancing vehicle to park; according to the inquiry message, determining whether the surveillance camera device can determine a current location of the self-balancing vehicle and a target location of a target parking spot for the self-balancing vehicle to park; if it is determined that the surveillance camera device can determine a current location of the self-balancing vehicle and a target location of a target parking spot for the self-balancing vehicle to park, determining a complexity degree of controlling the self-balancing vehicle to park; and sending a second response message to the self-balancing vehicle, the second response message including the complexity degree of controlling the self-balancing vehicle to park.

In an embodiment, the step 402 of determining a target location of the self-balancing vehicle can include: if the surveillance camera device identifies more than one target parking spot for the self-balancing vehicle to park, determining a target parking spot corresponding to a minimum value of the complexity degrees of controlling the self-balancing vehicle to park as the target parking spot for the self-balancing vehicle to park, and determining the target location according to the target parking spot.

Consistent with the embodiments of the present disclosure, a route for the self-balancing vehicle travelling from the current location to the target location can be calculated for controlling the self-balancing vehicle to park according to the parking instruction information. The reliability of automatically parking the self-balancing vehicle can be improved.

Figure 5:
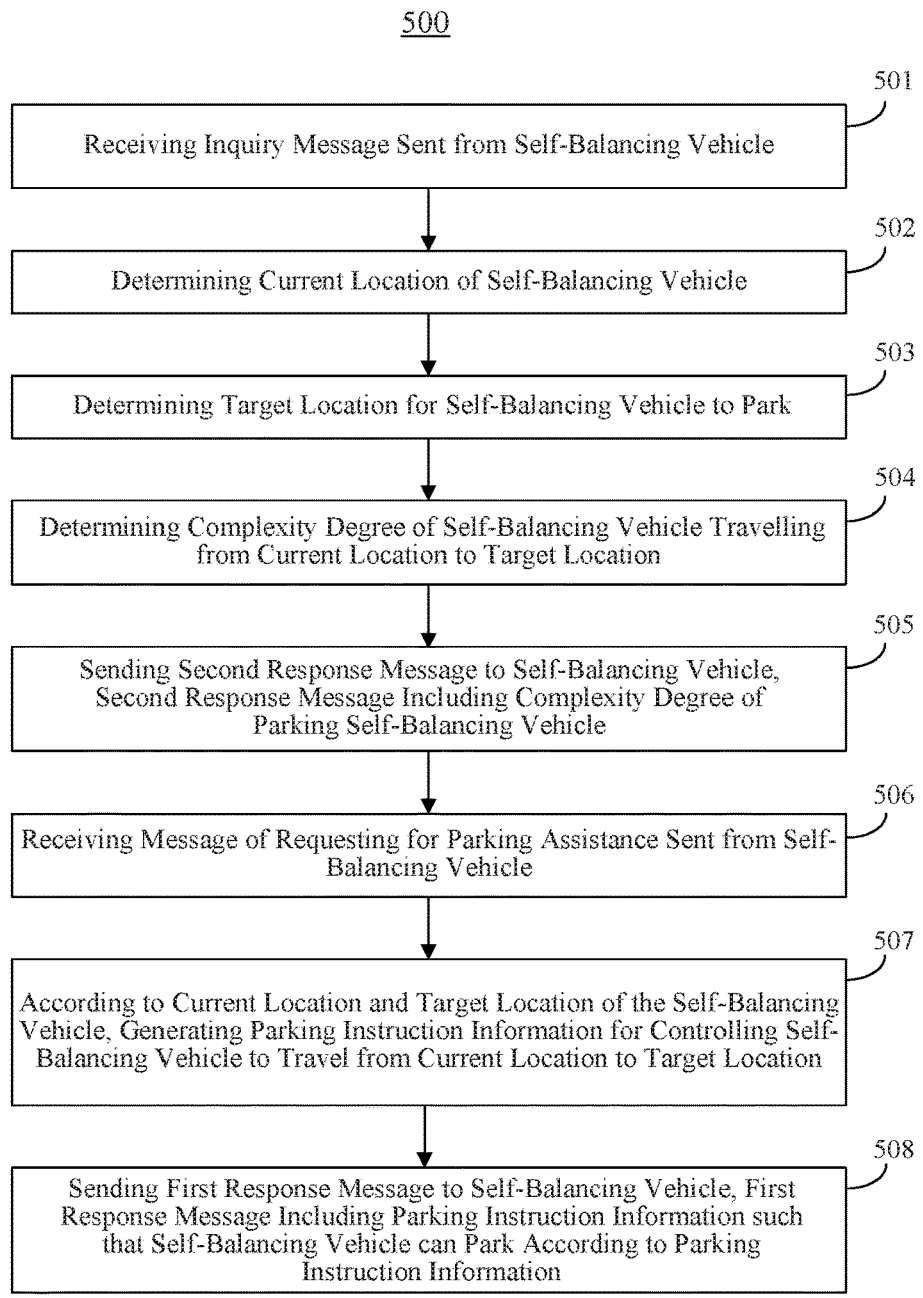
FIG. 5 is a flowchart illustrating another method for controlling a self-balancing vehicle to park according to a fourth exemplary embodiment.

FIG. 5 is a flowchart illustrating a method 500 for controlling a self-balancing vehicle to park according to another exemplary embodiment. The method 500 may be performed by a surveillance camera device. As shown in FIG. 5, the method 500 for controlling a self-balancing vehicle to park includes the following steps.

At step 501, an inquiry message sent from the self-balancing vehicle is received.

In an embodiment, the inquiry message is used for inquiring whether the surveillance camera device can control the self-balancing vehicle to park.

At step 502, a current location of the self-balancing vehicle is determined.

The current location of the self-balancing vehicle can be determined by the following three approaches.

First, if the current surveillance image presents the self-balancing vehicle, the current location of the self-balancing vehicle can be determined according to the current surveillance image.

Second, if the current surveillance image does not present the self-balancing vehicle, the image capturing apparatus of the surveillance camera device can be controlled to rotate within a preset range, and stop rotating when a target surveillance image presenting the self-balancing vehicle is captured. The current location of the self-balancing vehicle can be determined according to the target surveillance image.

Third, a location requesting message is sent to the self-balancing vehicle and the current location of the self-balancing vehicle can be determined according to a location indication signal transmitted from the self-balancing vehicle.

In an embodiment, when the self-balancing vehicle generates the location indication signal according to the location requesting message, a signal capturing apparatus of the surveillance camera device can be controlled to capture the location indication signal. The location indication signal can be an acoustic signal and/or an optical signal. The current location of the self-balancing vehicle can be determined according to the location indication signal transmitted from the self-balancing vehicle.

At step 503, a target location for the self-balancing vehicle to park is determined.

The target location of the self-balancing vehicle can be determined by the following approaches.

First, if the current surveillance image presents a target parking spot for the self-balancing vehicle to park, the target location of the self-balancing vehicle is determined according to the target parking spot in the current surveillance image.

Second, if the current surveillance image does not present a target parking spot for the self-balancing vehicle to park, the image capturing apparatus of the surveillance camera device is controlled to rotate within a preset range, and to stop rotating when a target surveillance image presenting a target parking spot is captured. The target location of the self-balancing vehicle is determined according to the target surveillance image.

At step 504, a complexity degree of the self-balancing vehicle travelling from the current location to the target location is determined.

In an embodiment, the complexity degree of travelling to the target location can be determined according a length of a route of travelling from the current location to the target location, a number of turns in the route and the like.

At step 505, a second response message is sent to the self-balancing vehicle. The second response message includes the complexity degree of parking the self-balancing vehicle.

At step 506, a message of requesting for parking assistance sent from a self-balancing vehicle is received.

At step 507, according to the current location of the self-balancing vehicle and the target location of the self-balancing vehicle, parking instruction information for controlling the self-balancing vehicle to travel from the current location to the target location is generated.

At step 508, a first response message is sent to the self-balancing vehicle. The first response message includes the parking instruction information such that the self-balancing vehicle can park according to the parking instruction information.

Based on the beneficial technical effects of the above embodiments, the present embodiment also has the following technical benefits. If the surveillance camera device determines more than one parking spot for the self-balancing vehicle to park, an optimal parking spot can be determined as the target parking spot of the self-balancing vehicle according to a complexity degree of the self-balancing vehicle travelling to each of the parking spots and reliability of each of the parking spots. The reliability of parking the self-balancing vehicle can be improved.

The present disclosure also provides embodiments illustrating devices for controlling a self-balancing vehicle to park, corresponding to the methods described above.

Figure 6:
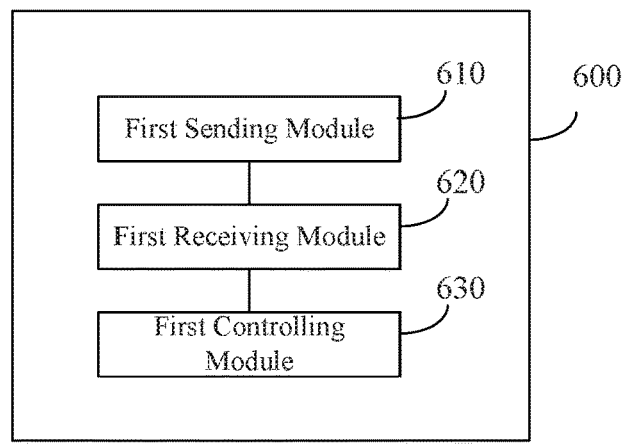
FIG. 6 is a block diagram illustrating a device for controlling a self-balancing vehicle to park according to an exemplary embodiment.

FIG. 6 is a block diagram illustrating a device 600 for controlling a self-balancing vehicle to park according to an exemplary embodiment. The device 600 may be included in the self-balancing vehicle. As shown in FIG. 6, the device 600 for controlling a self-balancing vehicle to park includes a first sending module 610, a first receiving module 620, and a first controlling module 630.

The first sending module 610 is configured to send a message of requesting for parking assistance to a surveillance camera device for controlling the self-balancing vehicle to park.

The first receiving module 620 is configured to receive a first response message that is returned from the surveillance camera device according to the message of requesting for parking assistance. The first response message includes parking instruction information for controlling the self-balancing vehicle to travel from a current location to a target location.

A first controlling module 630 is configured to control the self-balancing vehicle to travel from the current location to the target location and park according to the parking instruction information.

Figure 7:
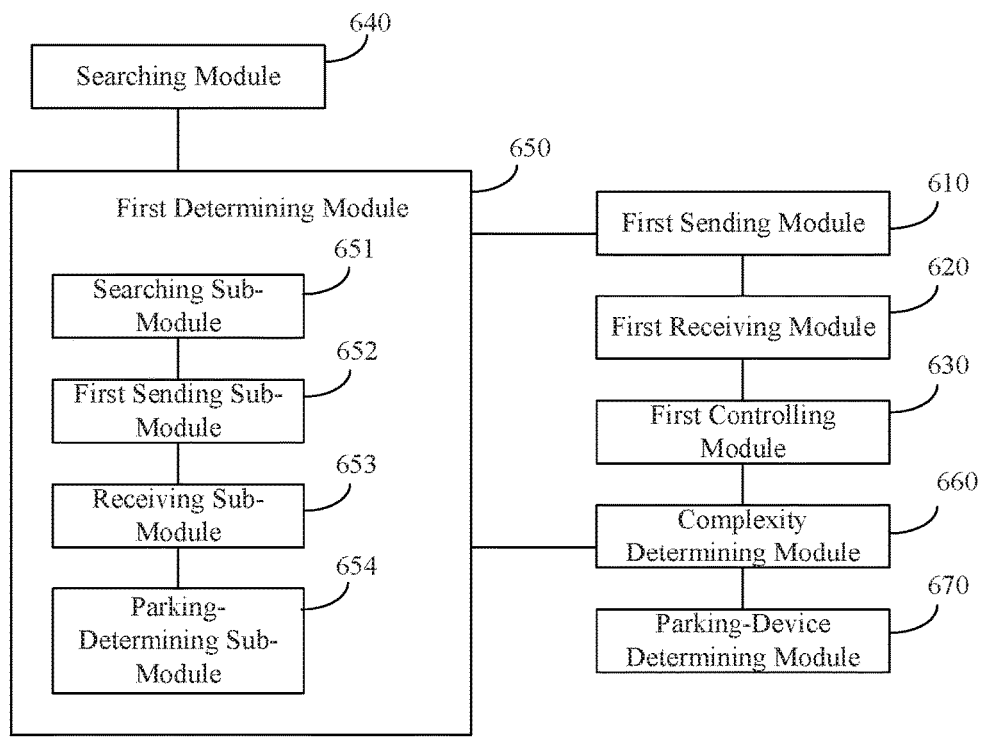
FIG. 7 is a block diagram illustrating another device for controlling a self-balancing vehicle to park according to an exemplary embodiment.

FIG. 7 is a block diagram illustrating another device 700 for controlling a self-balancing vehicle to park according to an exemplary embodiment. The device 700 may be included in the self-balancing vehicle. As shown in FIG. 7, the device can include the first sending module 610, the first receiving module 620, and the first controlling module 630, as shown in FIG. 6, and the following elements.

A searching module 640 is configured to determine whether there is a surveillance camera device that can establish a preset type of short-distance communication connection with the self-balancing vehicle.

A first determining module 650 configured to, if the searching module 640 determines that there is a surveillance camera device that can establish a preset type of short-distance communication connection with the self-balancing vehicle, determine whether the surveillance camera device can control the self-balancing vehicle to park.

In an embodiment, the first determining module 650 can include a searching sub-module 651, a first sending sub-module 652, a receiving sub-module 653, and a parking-determining sub-module 654.

The searching sub-module 651 is configured to, if the searching module 640 determines that there is a surveillance camera device that can establish a preset type of short-distance communication connection with the self-balancing vehicle, determine whether the surveillance camera device has permission to control the self-balancing vehicle to park by looking up a preset control list including surveillance camera devices which have permission to control the self-balancing vehicle to park.

The first sending sub-module 652 is configured to, if the searching sub-module 651 determines that the surveillance camera device has permission to control the self-balancing vehicle to park, send an inquiry message to a surveillance camera device. The inquiry message is for inquiring of the surveillance camera device about whether the surveillance camera device can control the self-balancing vehicle to park.

The receiving sub-module 653 is configured to receive a second response message which is returned by the surveillance camera device according to the inquiry message sent by the first sending sub-module 652. The second response message includes a complexity degree of controlling the self-balancing vehicle to park.

The parking-determining sub-module 654 is configured to, if the complexity degree included in the second response message received by the receiving sub-module 653 is smaller than a preset complexity degree threshold, determine that the surveillance camera device can control the self-balancing vehicle to park.

In an embodiment, the device 700 can further include a complexity determining module 660 and a parking-device determining module 670.

The complexity determining module 660 is configured to, if the parking-determining sub-module 654 determines that there are two or more surveillance camera devices which have permission to control the self-balancing vehicle to park, determine a complexity degree for each of the two or more surveillance camera devices.

The parking-device determining module 670 is configured to determine a surveillance camera device corresponding to a minimum value of the complexity degrees of the two or more surveillance camera devices, which are determined by the complexity determining module 660 as the surveillance camera device for controlling the self-balancing vehicle to park. The first sending module 610 is configured to send a message of requesting for parking assistance to the surveillance camera device.

Figure 8:
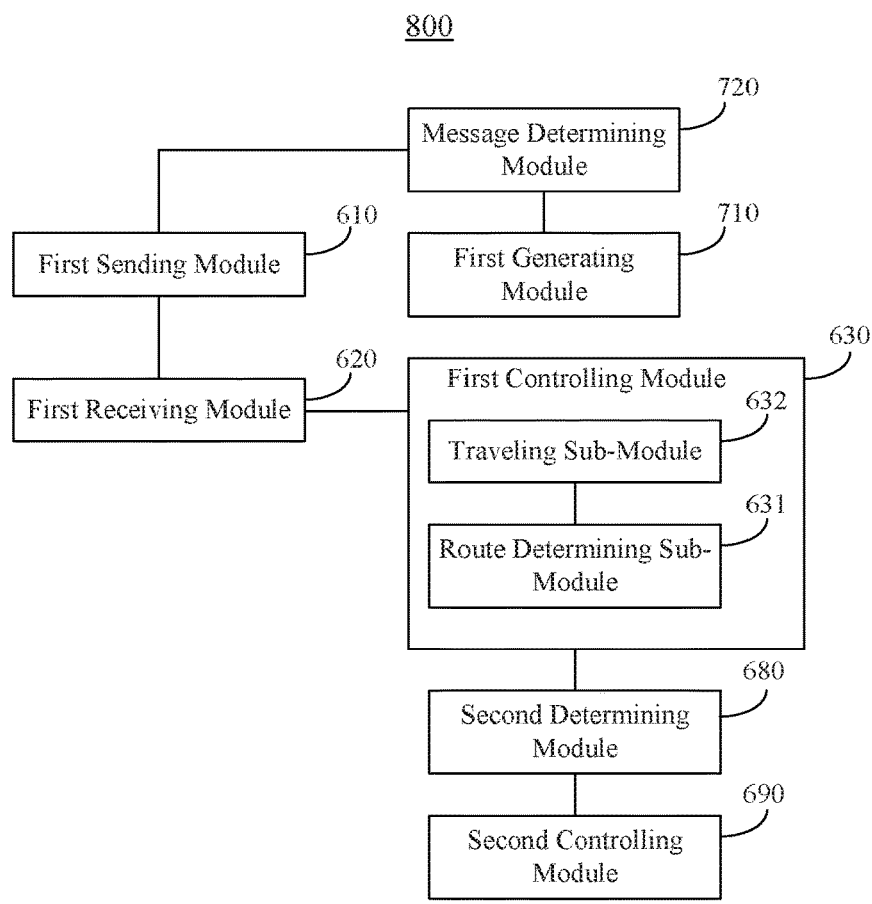
FIG. 8 is a block diagram illustrating still another device for controlling a self-balancing vehicle to park according to an exemplary embodiment.

FIG. 8 is a block diagram illustrating another device 800 for controlling a self-balancing vehicle to park according to an exemplary embodiment. The device 800 may be included in the self-balancing vehicle. As shown in FIG. 8, the device 800 includes the first sending module 610, the first receiving module 620, and the first controlling module 630, as shown in FIG. 6. The first controlling module 630 includes a route determining sub-module 631 and a traveling sub-module 632.

The route determining sub-module 631 is configured to determine a travelling route from the current location to the target location according to the parking instruction information in the first response message received by the first receiving module 620.

The traveling sub-module 632 is configured to control the self-balancing vehicle to travel to the target location and park according to the travelling route determined by the route determining sub-module 631.

In an embodiment, the device 800 can further include a second determining module 680 and a second controlling module 690.

The second determining module 680 is configured to determine whether the self-balancing vehicle arrives at the target location under the control of the first controlling module 630.

The second controlling module 690 is configured to, after the second determining module 680 determines that the self-balancing vehicle arrives at the target location, adjust the posture of the self-balancing vehicle such that the self-balancing vehicle can park at the target location.

In an embodiment, the device 800 can further include a message determining module 720 and a first generating module 710.

The message determining module 720 is configured to determine whether a location requesting message sent from the surveillance camera device is received.

The first generating module 710 is configured to, if the message determining module 720 determines that a location requesting message sent from the surveillance camera device is received, generate a location indication signal for indicating the current location of the self-balancing vehicle. The location indication signal may be an acoustic signal and/or an optical signal.

Figure 9:
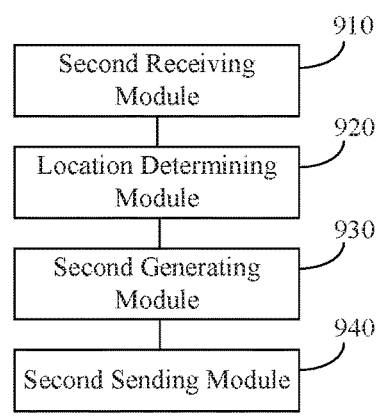
FIG. 9 is a block diagram illustrating a device for controlling a self-balancing vehicle to park according to an exemplary embodiment.

FIG. 9 is a block diagram illustrating a device 900 for controlling a self-balancing vehicle to park according to an exemplary embodiment. The device 900 may be included in a surveillance camera device. As shown in FIG. 9, the device 900 for controlling a self-balancing vehicle to park can include a second receiving module 910, a location determining module 920, a second generating module 930, and a second sending module 940.

The second receiving module 910 is configured to receive a message of requesting for parking assistance sent from a self-balancing vehicle.

The location determining module 920 is configured to, if the second receiving module 910 receives the message of requesting for parking assistance, determine a current location and a target location of the self-balancing vehicle.

The second generating module 930 is configured to, according to the current location of the self-balancing vehicle and the target location of the self-balancing vehicle, generate parking instruction information for controlling the self-balancing vehicle to travel from the current location to the target location.

The second sending module 940 is configured to send a first response message to the self-balancing vehicle. The first response message includes the parking instruction information such that the self-balancing vehicle can park according to the parking instruction information.

Figure 10:
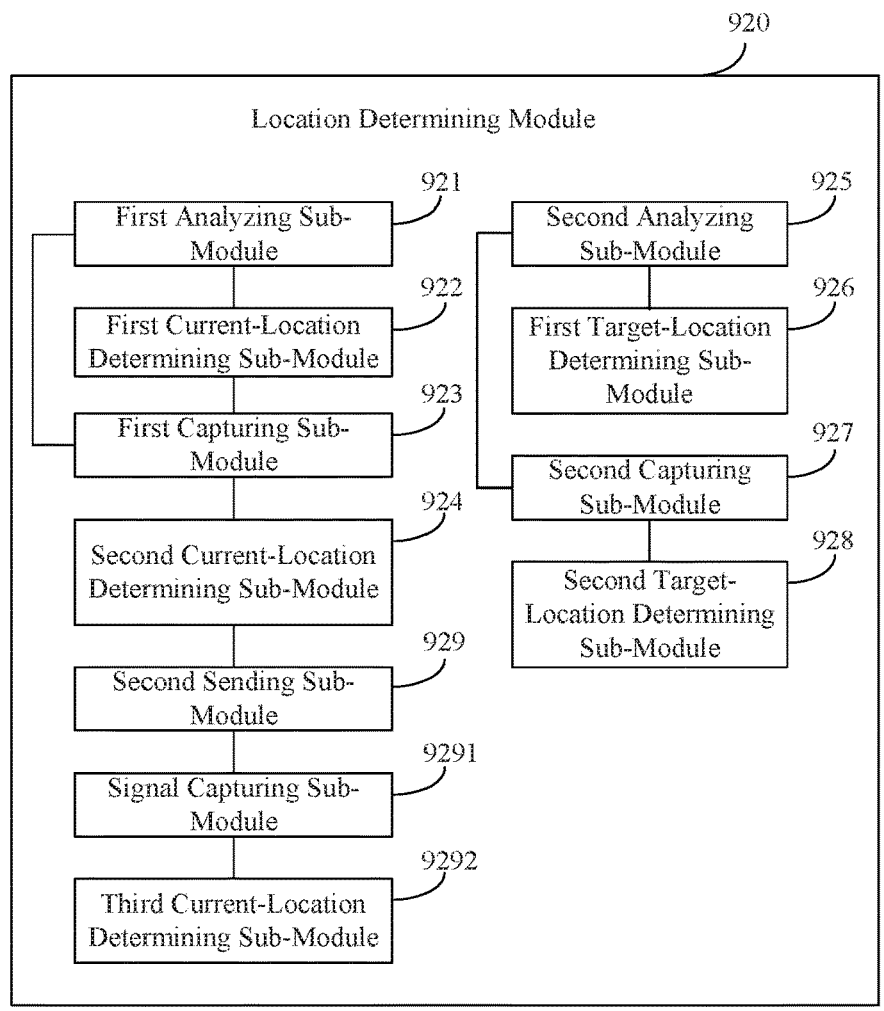
FIG. 10 is a block diagram illustrating a location determining module according to an exemplary embodiment.

FIG. 10 is a block diagram illustrating the location determining module 920 according to an exemplary embodiment. As shown in FIG. 10, the location determining module 920 can include a first analyzing sub-module 921, and a first current-location determining sub-module 922, a first capturing sub-module 923, and a second current-location determining sub-module 924.

The first analyzing sub-module 921 is configured to, if the second receiving module 910 receives the message of requesting for parking assistance, determine whether a current surveillance image of the surveillance camera device presents the self-balancing vehicle.

The first current-location determining sub-module 922 is configured to, if the first analyzing sub-module 921 determines that the current surveillance image presents the self-balancing vehicle, determine the current location of the self-balancing vehicle according to the current surveillance image.

The first capturing sub-module 923 is configured to, if the first analyzing sub-module 921 determines that the current surveillance image does not present the self-balancing vehicle, control an image capturing apparatus of the surveillance camera device to rotate within a preset range, and to stop rotating when a target surveillance image presenting the self-balancing vehicle is captured.

The second current-location determining sub-module 924 is configured to determine the current location of the self-balancing vehicle according to the target surveillance image captured by the image capturing apparatus controlled by the first capturing sub-module 923.

In an embodiment, the location determining module 920 can further include a second analyzing sub-module 925, a first target-location determining sub-module 926, a second capturing sub-module 927, and a second target-location determining sub-module 928.

The second analyzing sub-module 925 is configured to, if the second receiving module 910 receives the message of requesting for parking assistance, determine whether a current surveillance image of the surveillance camera device presents a target parking spot for the self-balancing vehicle to park.

The first target-location determining sub-module 926 is configured to, if the second analyzing sub-module 925 determines that the current surveillance image presents a target parking spot for the self-balancing vehicle to park, determine the target location of the self-balancing vehicle according to the target parking spot in the current surveillance image.

The second capturing sub-module 927 is configured to, if the second analyzing sub-module 925 determines that the current surveillance image does not present a target parking spot for the self-balancing vehicle to park, control an image capturing apparatus of the surveillance camera device to rotate within a preset range, and to stop rotating when a target surveillance image presenting a target parking spot is captured.

The second target-location determining sub-module 928 is configured to determine the target location of the self-balancing vehicle according to the target surveillance image captured by the image capturing apparatus controlled by the second capturing sub-module 927.

In an embodiment, the location determining module 920 can further include a second sending sub-module 929, a signal capturing sub-module 9291, and a third current-location determining sub-module 9292.

The second sending sub-module 929 is configured to, if the second receiving module 910 receives the message of requesting for parking assistance, send a location requesting message to the self-balancing vehicle.

The signal capturing sub-module 9291 is configured to, when the self-balancing vehicle generates a location indication signal according to the location requesting message sent by the second sending sub-module 929, control a signal capturing apparatus of the surveillance camera device to capture the location indication signal. The location indication signal may be an acoustic signal and/or an optical signal.

The third current-location determining sub-module 9292 is configured to determine the current location of the self-balancing vehicle according to the location indication signal captured by the signal capturing apparatus controlled by the signal capturing sub-module 9291.

Figure 11:
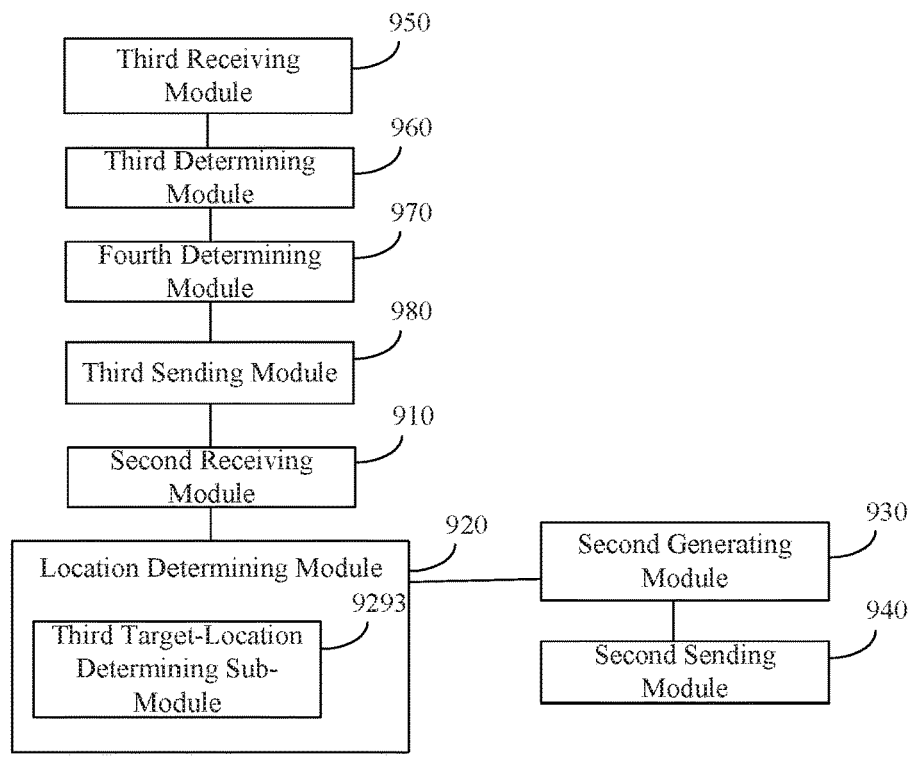
FIG. 11 is a block diagram illustrating still another device for controlling a self-balancing vehicle to park according to an exemplary embodiment.

FIG. 11 is a block diagram illustrating still another device 1100 for controlling a self-balancing vehicle to park according to an exemplary embodiment. As shown in FIG. 11, the device 1100 includes a second receiving module 910, a location determining module 920, a second generating module 930, and a second sending module 940 as shown in FIG. 9, and further includes a third receiving module 950, a third determining module 960, a fourth determining module 970, and a third sending module 980.

The third receiving module 950 is configured to receive an inquiry message sent from the self-balancing vehicle. The inquiry message is for inquiring of the surveillance camera device about whether the surveillance camera device can control the self-balancing vehicle to park.

The third determining module 960 is configured to, according to the inquiry message received by the third receiving module 950, determine whether the surveillance camera device can determine a current location of the self-balancing vehicle and a target location of a target parking spot for the self-balancing vehicle to park.

The fourth determining module 970 is configured to, if the third determining module 960 determines that the surveillance camera device can determine a current location of the self-balancing vehicle and a target location of a target parking spot for the self-balancing vehicle to park, determine a complexity degree of controlling the self-balancing vehicle to park.

The third sending module 980 is configured to send a second response message to the self-balancing vehicle. The second response message includes the complexity degree of controlling the self-balancing vehicle to park.

In an embodiment, the location determining module 920 can include a third target-location determining sub-module 9293 configured to, if the third determining module 960 determines that the surveillance camera device finds out more than one target parking spot for the self-balancing vehicle to park, determine a target parking spot corresponding to a minimum value of the complexity degrees of controlling the self-balancing vehicle to park as the target parking spot, and determine the target location according to the target parking spot.

With respect to the devices in the above embodiments, the specific manners for performing operations for individual modules or sub-modules therein have been described in detail in the embodiments of the methods, which will not be elaborated herein.

Implementation of the functions and operations of the modules in the above devices can specifically refer to the implementation of the corresponding steps in the above methods, which will not be repeated herein.

The device embodiments described above are merely illustrative. The modules and sub-modules described as separate may be or may not be physically separate, and the components illustrated as units and sub-modules may be or may not be physical units, and may be at the same location, or may be distributed to multiple units over the network. A part of or all of the modules and sub-modules can be selected to achieve the objective of the present disclosure as desired. One skilled in the art can understand and practice the embodiments without paying creative labor.

Figure 12:
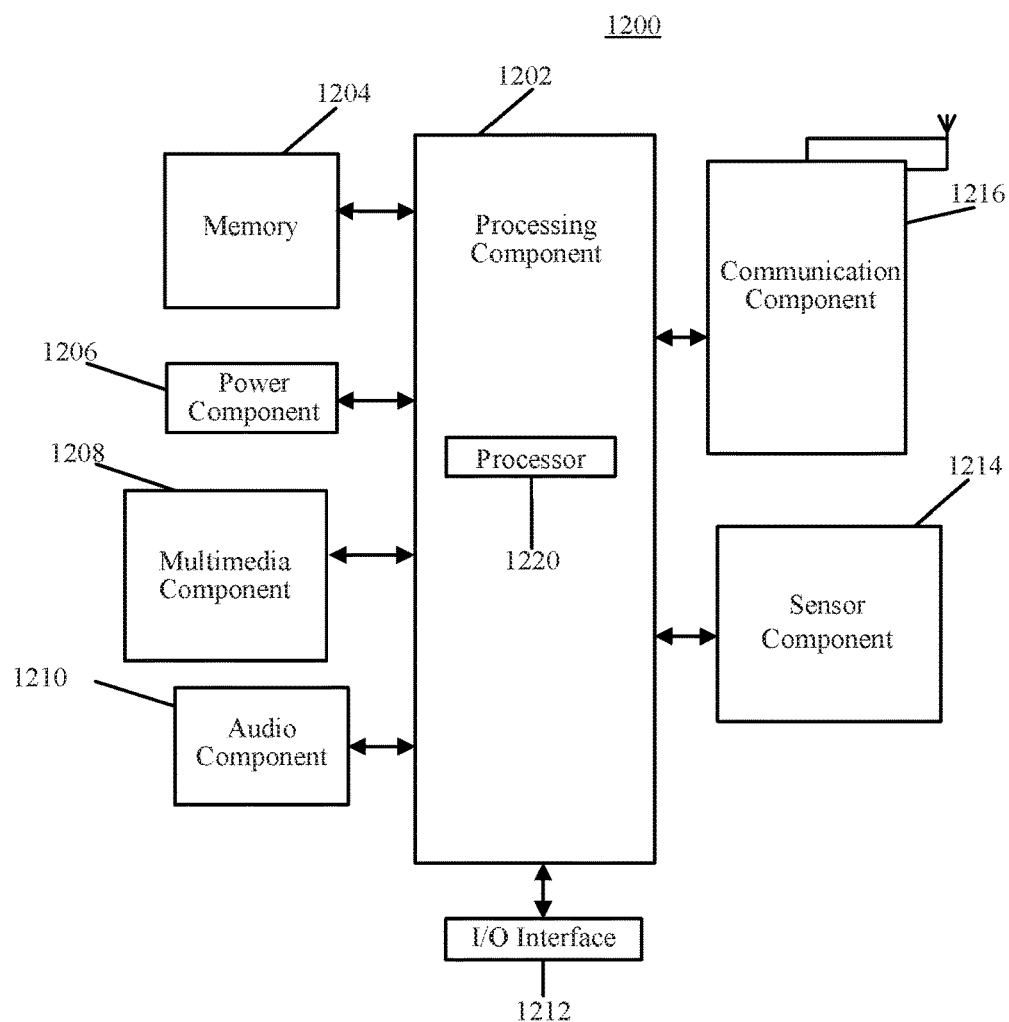
FIG. 12 is a block diagram illustrating a device for controlling a self-balancing vehicle to park according to an exemplary embodiment.

FIG. 12 is a block diagram of a device 1200 for controlling a self-balancing vehicle to park according to an exemplary embodiment. The device 1200 may be included in a self-balancing vehicle or a surveillance camera device.

Referring to FIG. 12, the device 1200 can include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the device 1200, such as the operations associated with data communications, camera operations, and recording operations. The processing component 1202 can include one or more processors 1220 to execute instructions to perform all or part of the steps in the above described methods. Moreover, the processing component 1202 can include one or more modules which facilitate the interaction between the processing component 1202 and other components. For instance, the processing component 1202 can include a multimedia module to facilitate the interaction between the multimedia component 1208 and the processing component 1202.

The memory 1204 is configured to store various types of data to support the operation of the device 1200. Examples of such data include instructions for any applications or methods operated on the device 1200, preset thresholds, control lists, messages, pictures, video, etc. The memory 1204 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the device 1200. The power component 1206 can include a power management system, one or more power sources, and any other components associated with the generation, management, and distribution of power in the device 1200.

The multimedia component 1208 includes a screen providing an output interface between the device 1200 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 1208 includes a front camera and/or a rear camera. The front camera and the rear camera can receive an external multimedia datum while the device 1200 is in an operation mode, such as a photographing mode or a video mode. Each of the front camera and the rear camera can be a fixed optical lens system or have focus and optical zoom capability.

The audio component 1210 is configured to output and/or input audio signals. For example, the audio component 1210 includes a microphone ("MIC") configured to receive an external audio signal when the device 1200 is in an operation mode, such as a call mode, a recording mode, and a voice recognition mode. The received audio signal can be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons can include, but are not limited to, a home button, a volume button, a starting button, and a locking button.

The sensor component 1214 includes one or more sensors to provide status assessments of various aspects of the device 1200. For instance, the sensor component 1214 can detect an open/closed status of the device 1200, relative positioning of components, e.g., the display and the keypad, of the device 1200, a change in position of the device 1200 or a component of the device 1200, a presence or absence of user contact with the device 1200, an orientation or an acceleration/deceleration of the device 1200, and a change in temperature of the device 1200. The sensor component 1214 can include a proximity sensor configured to detect the presence of nearby objects without any physical contact. The sensor component 1214 can also include a light sensor, such as a CMOS or CCD image sensor, for use in imaging applications. In some embodiments, the sensor component 1214 can also include an accelerometer sensor, a gyroscope sensor, a magnetic sensor, a pressure sensor, or a temperature sensor.

The communication component 1216 is configured to facilitate communication, wired or wirelessly, between the device 1200 and other devices. The device 1200 can access a wireless network based on a communication standard, such as WiFi, 2G; 3G, or 4G, or a combination thereof. In one exemplary embodiment, the communication component 1216 receives a broadcast signal or broadcast associated information from an external broadcast management system via a broadcast channel. In one exemplary embodiment, the communication component 1216 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 1200 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1204, executable by the processor 1220 in the device 1200, for performing the above-described methods. For example, the non-transitory computer-readable storage medium can be a ROM, a RAM, a CD-ROM, a magnetic tape, a floppy disc, an optical data storage device, and the like.

The present disclosure also provides a non-transitory computer readable storage medium storing instructions that, when executed by a processor in a self-balancing vehicle, cause the self-balancing vehicle to perform a method, including: sending a message of requesting for parking assistance to a surveillance camera device for controlling the self-balancing vehicle to park; receiving a first response message which is returned from the surveillance camera device according to the message of requesting for parking assistance, the first response message including parking instruction information for controlling the self-balancing vehicle to travel from a current location to a target location; and controlling the self-balancing vehicle to travel from the current location to the target location and to park according to the parking instruction information.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for controlling a self-balancing vehicle to park, the method being performed by the self-balancing vehicle and comprising:
    sending, by the self-balancing vehicle, a message of requesting for parking assistance to a surveillance camera device for controlling the self-balancing vehicle to park;
    receiving, by the self-balancing vehicle, a first response message returned from the surveillance camera device according to the message of requesting for parking assistance, the first response message including parking instruction information for controlling the self-balancing vehicle to travel from a current location of the self-balancing vehicle to a target location; and
    controlling the self-balancing vehicle to travel from the current location to the target location and to park according to the parking instruction information.

2. The method of claim 1, wherein before sending a message of requesting for parking assistance, the method further comprises:
    determining whether there is a surveillance camera device that can establish a preset type of short-distance communication connection with the self-balancing vehicle; and
    if there is a surveillance camera device that can establish a preset type of short-distance communication connection with the self-balancing vehicle, determining whether the surveillance camera device can control the self-balancing vehicle to park.

3. The method of claim 2, wherein the determining whether the surveillance camera device can control the self-balancing vehicle to park comprises:
    determining whether the surveillance camera device has permission to control the self-balancing vehicle to park by looking up a preset control list that records surveillance camera devices which have permission to control the self-balancing vehicle to park;
    if it is determined that the surveillance camera device has permission to control the self-balancing vehicle to park, sending an inquiry message to the surveillance camera device, to inquire whether the surveillance camera device can control the self-balancing vehicle to park;
    receiving a second response message returned by the surveillance camera device according to the inquiry message, the second response message including a complexity degree of controlling the self-balancing vehicle to park; and if the complexity degree is smaller than a preset complexity degree threshold, determining that the surveillance camera device can control the self-balancing vehicle to park.

4. The method of claim 3, further comprising:

if there are two or more surveillance camera devices which have permission to control the self-balancing vehicle to park, determining a complexity degree for each of the two or more surveillance camera devices; and determining a surveillance camera device corresponding to a minimum value of the complexity degrees of the two or more surveillance camera devices as the surveillance camera device for controlling self-balancing vehicle park, and performing the sending of the message of requesting for parking assistance to the determined surveillance camera device.

5. The method of claim 1, wherein the controlling of the self-balancing vehicle to travel from the current location to the target location and to park according to the parking instruction information comprises:

determining a travelling route from the current location to the target location according to the parking instruction information; and controlling the self-balancing vehicle to travel to the target location and to park according to the travelling route.

6. The method of claim 1, further comprising:

determining whether the self-balancing vehicle arrives at the target location; and after it is determined that the self-balancing vehicle arrives at the target location, adjusting a posture of the self-balancing vehicle such that the self-balancing vehicle can park at the target location.

7. The method of claim 1 further comprising:

determining whether a location requesting message sent from the surveillance camera device is received; and if a location requesting message sent from the surveillance camera device is received generating a location indication signal for indicating the current location of the self-balancing vehicle, the location indication signal being at least one of an acoustic signal or an optical signal.

8. A device for controlling a self-balancing vehicle to park, comprising:

a processor implemented in the self-balancing vehicle; and a memory for storing instructions executable by the processor, wherein the processor is configured to perform:

sending a message of requesting for parking assistance to a surveillance camera device for controlling the self-balancing vehicle to park;

receiving a first response message returned from the surveillance camera device according to the message of requesting for parking assistance, the first response message including parking instruction information for controlling the self-balancing vehicle to travel from a current location of the self-balancing vehicle to a target location; and controlling the self-balancing vehicle to travel from the current location to the target location and to park according to the parking instruction information.

9. The device of claim 8, wherein the processor is further configured to perform:

determining whether there is a surveillance camera device that can establish a preset type of short-distance communication connection with the self-balancing vehicle; and if there is a surveillance camera device that can establish a preset type of short-distance communication connection with the self-balancing vehicle, determining whether the surveillance camera device can control self-balancing vehicle park.

10. The device of claim 9, wherein the processor is further configured to perform:

determining whether the surveillance camera device has permission to control the self-balancing vehicle to park by looking up a preset control list that records surveillance camera devices which have permission to control the self-balancing vehicle to park;

if it is determined that the surveillance camera device has permission to control the self-balancing vehicle to park, sending an inquiry message to the surveillance camera device, to inquire whether the surveillance camera device can control the self-balancing vehicle to park;

receiving a second response message returned by the surveillance camera device according to the inquiry message, the second response message including a complexity degree of controlling the self-balancing vehicle to park; and if the complexity degree is smaller than a preset complexity degree threshold, determining that the surveillance camera device can control the self-balancing vehicle to park.

11. The device of claim 10, wherein the processor is further configured to perform:

if there are two or more surveillance camera devices which have permission to control the self-balancing vehicle to park, determining a complexity degree for each of the two or more surveillance camera devices; and determining a surveillance camera device corresponding to a minimum value of the complexity degrees of the two or more surveillance camera devices as the surveillance camera device for controlling the self-balancing vehicle to park, and performing the sending of the message of requesting for parking assistance to the determined surveillance camera device.

12. The device of claim 8, wherein the processor is further configured to perform:

determining whether the self-balancing vehicle arrives at the target location; and after it is determined that the self-balancing vehicle arrives at the target location, adjusting a posture of the self-balancing vehicle such that the self-balancing vehicle can park at the target location.

13. The device of claim 8, wherein the processor is further configured to perform:

determining whether a location requesting message sent from the surveillance camera device is received; and if a location requesting message sent from the surveillance camera device is received, generating a location indication signal for indicating the current location of the self-balancing vehicle, the location indication signal being at least one of an acoustic signal or an optical signal.

14. A device for controlling a self-balancing vehicle to park, comprising:

a processor; and a memory for storing instructions executable by the processor, wherein the processor is configured perform:
- receiving a message of requesting for parking assistance sent from the self-balancing vehicle;
- determining a current location and a target location of the self-balancing vehicle according to the current location and the target location of the self-balancing vehicles generating parking instruction information for controlling the self-balancing vehicle to travel from the current location to the target location; and
- sending a first response message to the self-balancing vehicle, the first response message including the parking instruction information to control the self-balancing vehicle to park according to the parking instruction information.

15. The method of claim 1, further comprising:

determining whether the self-balancing vehicle is about to be turned off;

wherein sending the message of requesting for parking assistance to a surveillance camera device is a response to a determination that the self-balancing vehicle is about to be turned off.

16. The method of claim 1, further comprising:

automatically parsing, by the self-balancing vehicle, the parking instruction information from the received first response message to control the self-balancing vehicle to travel from the current location to the targeted location.

* * * * *